March 7, 1944.        P. BAKER            2,343,518
             ELECTRIC LIGHTING DEVICE
              Filed Sept. 15, 1941        2 Sheets-Sheet 1
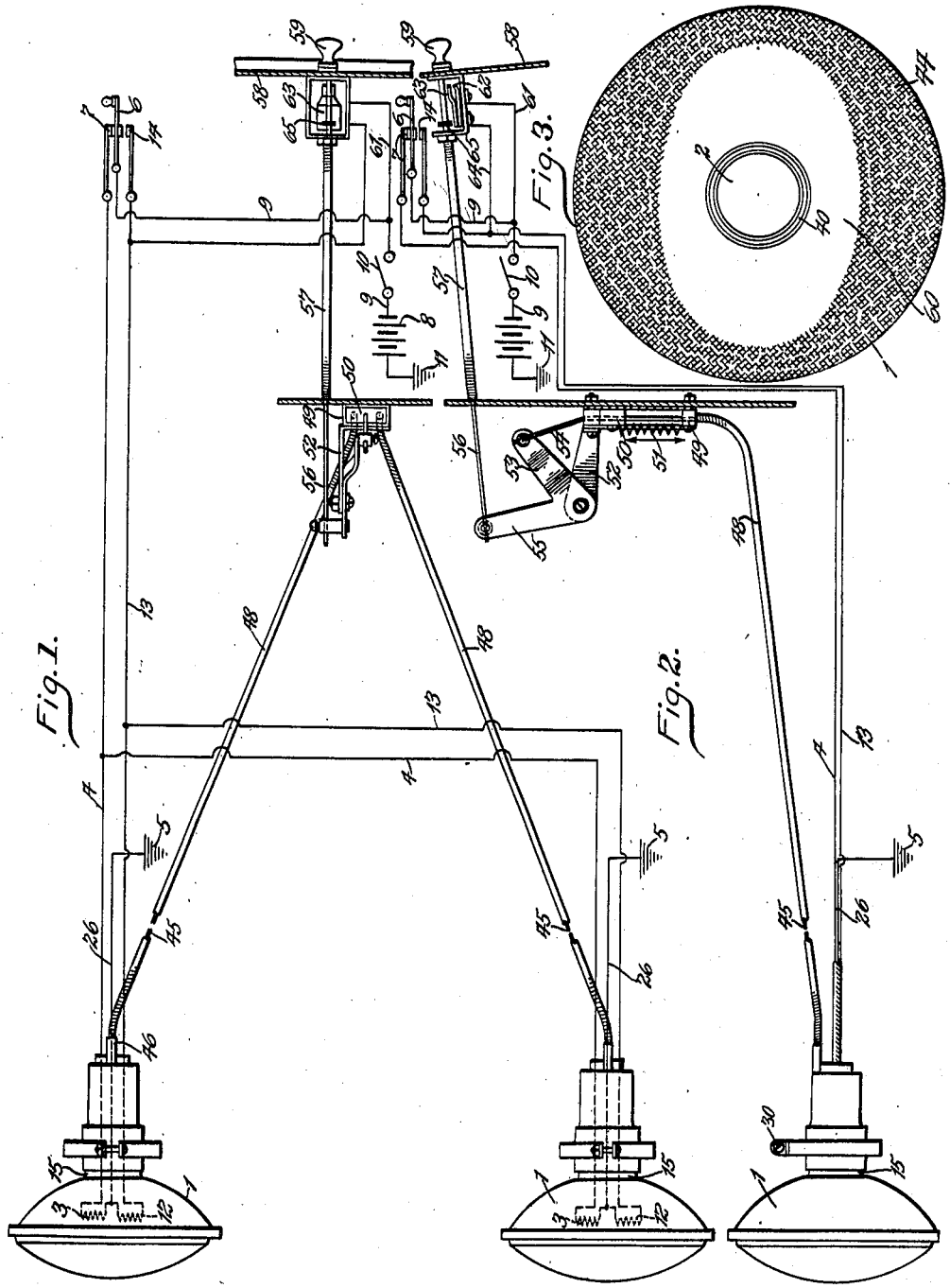
Inventor
Paul Baker
by John D. Rippey
His Attorney March 7, 1944.  P. BAKER  2,343,518
ELECTRIC LIGHTING DEVICE
Filed Sept. 15, 1941   2 Sheets-Sheet 2

Inventor
Paul Baker
by John D. Ripper
His Attorney

Patented Mar. 7, 1944

2,343,518

UNITED STATES PATENT OFFICE 2,343,518

ELECTRIC LIGHTING DEVICE

Paul Baker, Redondo Beach, Calif., assignor of one-fifth to John D. Rippey, St. Louis, Mo.

Application September 15, 1941, Serial No. 410,832

6 Claims. (Cl. 240—45)

This invention relates to electric lighting devices, and has special reference to electric lighting devices for use on motor vehicles, although it may well be applied to other uses.

An object of the invention is to provide an improved lighting device adapted for use in many conditions of climate and weather in which the usual white light devices cannot be satisfactorily used. For instance, the usual white lighting systems of automobiles and other motor vehicles do not function with any degree of satisfaction in fogs or in dense mists or in dust storms and sand storms, all of which conditions are quite common in various localities and sections of this country and other countries. These conditions have created a demand or a necessity for the provision of lighting devices or equipment that will function under and during such conditions to afford and provide sufficient light so that the vehicles may be driven with safety and the drivers may easily keep on the road. Some attempts have been made to supply these demands and necessities by providing auxiliary lights adapted to be attached to the vehicles usually at the front, and having colored lenses usually described as amber colored. However, when these auxiliary lights are used, the usual white headlights are not affected but continue to function as usual when they are on, or must be turned out to obtain any satisfactory use of the auxiliary light. These auxiliary lights are usually attached to the motor vehicles by attaching devices provided for that purpose, are in positions in which they are easily damaged by contact or collision with other objects, are easily removable and often are detached and removed by unauthorized persons and stolen. As a consequence, the demand for a satisfactory lighting device meeting the requirements above indicated continue, and no satisfactory solution of the problem has been evolved and made publicly available.

Another object of the present invention is to provide an improved lighting device for use on motor vehicles or in satisfactory positions, having means for eliminating objectionable colors of light by filtering and thereby control the light so as to afford the desired lighting effects under different prevailing conditions, such as the conditions mentioned and others. In the attainment of this objective, the lamps or bulbs for white lights and their reflectors are associated with means for controlling the color of the lights to meet the demands presented by interposing between the lamps or bulbs and their reflectors colored translucent members whereby the light rays from the lamps to the reflectors are changed as to color. In the embodiment of the invention chosen for illustration, I utilize cylinders or bands of amber colored translucent material movable to and from position to surround and extend between the outer portions of the lamps and their reflectors so that the reflected rays or beams essentially include an outer surrounding portion which is generally of the color of the cylinders; while the central portion thereof is white.

A specific object of the invention is to provide appropriately colored translucent cylinders or bands mounted for movement from retracted position to positions in which they surround at least the outer ends of the lamps or bulbs so that the light rays or beams pass through said cylinders or bands to the reflectors and the light reflected or projected thereby is of approximately the same color as the color of said cylinders or bands. Therefore, when amber colored translucent cylinders or bands surround the outer ends of the lamps or bulbs, the light projected by the reflectors includes an outer ring of light of approximately amber color. The composite light comprising central white beams and a surrounding ring of amber light in fogs, dense mists, dust or sand storms, etc., largely prevents reflection of the light and affords visibility far more effectively than will wholly white lights. Preferably, the exposed ends of the cylinders or tubes are arranged to function in cooperation with or as a part of the reflectors so that, when the cylinders or tubes are retracted to the positions they occupy when the white lights are used, they do not interfere in any way with the cooperative functioning of the reflectors and lamps; but, on the contrary, cooperate directly with and assist the reflectors.

Another object of the invention is to provide equipment for the purpose and of the character indicated including the cylinders or tubes colored to prevent the reflection or projection of white beams, in combination with mechanism for controlling the same to cooperate with the lamps or bulbs either when the low beams or rays are required, as in certain jurisdictions when vehicles are approaching from opposite directions, or when both high and low rays or beams are in use, as may be permissible when no other vehicle is meeting the vehicle equipped with the device. By use of this equipment, the driver or operator may turn off the high beams and turn on the low beams when approaching another vehicle moving in the opposite direction, as some jurisdictions require, without changing the amber color of the light beams; and, after passing said vehicle that had been met, the driver or operator may turn on the high beams of the lamps and thereafter continue to utilize both beams if desired until another vehicle is observed approaching from the opposite direction. In the attainment of this objective, the present invention turns on the low beams of the lights irrespective of whether the high beams are on or not.

Various other objects and advantages of the invention will be easily apparent from the following description, reference being made to the annexed drawings, in which—

Fig. 1 is a diagrammatic plan view of a lighting system for a motor vehicle made in accordance with the present invention.

Fig. 2 is a side elevation of the invention shown in Fig. 1.

Fig. 3 is a front plan elevation of a reflector diagrammatically showing the areas of contrastingly colored light rays projected by the reflector cooperating with the present invention.

Figure 4:
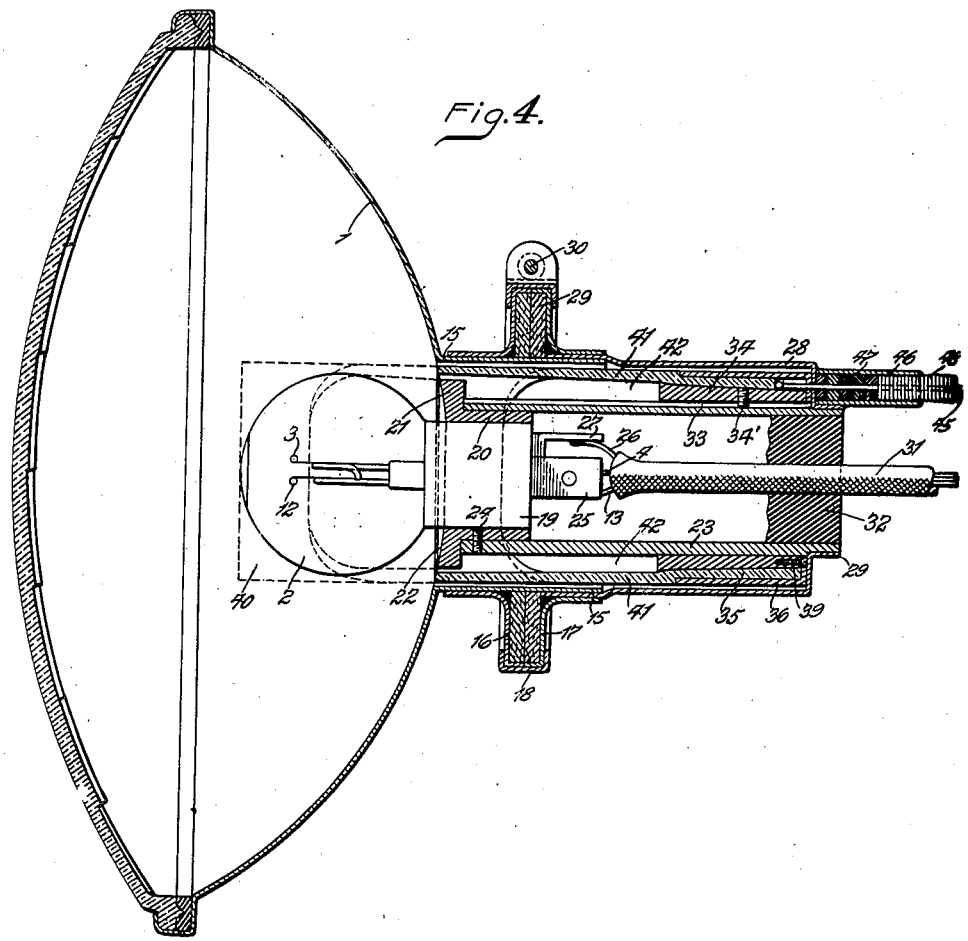
Fig. 4 is a sectional view of a conventional head light reflector having the present invention in connection therewith, the light color controlling tube being retracted.

The invention is shown in and constituting a part of the headlights of an automobile in order to change at least a part of the color of light beams from white to another color, and vice versa, to meet different needs and requirements. It is apparent that the invention may be adapted to various uses in which changes in the color of the light beams is desired.

The two reflectors 1 of the headlights or other lights may be of conventional or of any approved type and mounted in accordance with manufacturing standards. A lamp or light 2 is supported within each reflector so that the light therefrom will be projected and distributed by the reflector as light beams. The high or bright beams are provided by incandescence of the high beam filaments 3 by electrical energy supplied through a circuit wire 4 having a ground 5 and controlled by engaging the switch 6 with the contact 7. The electrical energy is supplied from a battery 8 through a wire 9 leading to the switch member 6 through a switch 10 adapted to be opened and closed, as is well known. The battery is grounded at 11.

The dim or low light beams are provided by incandescence of the low beam filaments 12 by electrical energy supplied through a circuit wire 13 having the same ground 5 as the high light beams and controlled by engaging the switch 6 with the contact 14. The switch 6 is adjustable in one position to cooperate with the wire 4 to render incandescent the high beam filaments 3 and in such position the circuit through this switch to the low beam filaments is open; and said switch is adjustable in another position as shown to close the circuit 13 to the low beam filaments 12, in which position the circuit to the high beam filaments 3 is open. This arrangement is now standard practice, and it is impossible to close the circuits to the high beam filaments and to the low beam filaments at the same time through the switch 6 because operation of said switch to close one of said circuits opens the other circuit, and vice versa.

My invention is embodied in a standard lighting system of this type. As shown, each reflector is changed from standard form and provided with a central tubular extension 15 projecting from the rear side of the reflector around a central opening. An attaching or coupling collar 16 is rigidly secured to the extension 15 and cooperates with a complementary collar 17 and an annular clamp 18 to hold a removable and replaceable unitary part of the invention in proper position with respect to the reflector. In my invention, the lamp 2 is attached to and constitutes a part of this removable and replaceable unit.

The sleeve 19 of the lamp 2 extends into and is integrally or otherwise attached to a collar 20 having at its forward end a circumferential flange 21. The flange 21 is formed with a dished or concave forward wall 22 which is in continuation of or in alinement with the dished or concave reflecting surface of the reflector 1 when the device is properly assembled. The wall 22, therefore, is in general continuation of the smooth surface of the reflector 1 and is finished as a reflecting surface to cooperate with the reflector 1. The collar 20 telescopes into the forward end of a tube 23 and is detachably secured thereto by removable and replaceable fastener screws 24. In proper assembly, the end of the tube 23 may abut against the rear side of the flange 21. The wires 4 and 13 are attached to complementary contact extensions 25 for the filaments 3 and 12 of the lamp 2, and the ground wire 26 leading to the ground 5 is attached to a contact extension 27 common to both of the filaments 3 and 12.

The tube 23 is rigidly attached within a supporting housing 28 by welding 29, or otherwise, to provide an impervious leak-proof joint. The forward end of the housing 28 telescopes onto the extension 15 and is rigidly attached to the collar 17. In assembly, the collars 16 and 17 are in abutting contact and provide an annular packing space containing gaskets 29 to provide an impervious moisture-proof joint. The split ring 18 encircles the peripheries of the two collars 16 and 17 and also engages against the opposite sides thereof to hold the assembly together. A releasable bolt 30 may be used to hold the ring 18 rigid on the collars 16 and 17. The cable 31 enclosing the wires 4, 13 and 26 extends into the tube 23 and may be embedded in a sealing compound or wax 32 having a high melting point and being moisture-proof and thereby excluding all moisture from the tube 23.

The tube 23 which is rigidly attached to and supports the collar 20 is of uniform outside diameter and is formed with a longitudinal groove 33 (Fig. 4). A bushing collar 34 is mounted for longitudinal sliding movements along the tube 23 within the space between the housing 28 and the tube 23. A lug 34' attached to the collar 34 engages within the groove 33 and leaves said collar 34 free for longitudinal movements along the tube and prevents relative turning of these parts. It is apparent that the collar 34 may be mounted for longitudinal movements along and held from turning relative to the tube 23 otherwise than by the specific means shown. The outer periphery of the collar 34 tapers from its inner end to its outer end complementarily to the inside formation of the end portion 35 of the device for regulating the color of the light from the lamp 2 as projected by the reflector 1. The collar 34 is preferably of metal or metallic alloy and is attached to the inside of the part 35 by cement or equivalent substance that fills all spaces or irregularities between said parts and cooperates with other fastening elements to hold said parts in rigid relationship.

The outer surface of the part 35 is preferably pitted or spotted. A sleeve 36 made of aluminum or other suitable material has its inner periphery spotted or knurled and is telescoped on the part 35, having its forward end abutting against a circumferential flange or shoulder 37 at the forward end of the part 35. A quantity of cement or the like is confined between the part 35 and the sleeve 36 and engages within and fills the pits or spots on the surfaces of said parts and holds them in rigid relationship. An inwardly extended flange 38 integral with the rear end of the sleeve 36 extends across the rear end of the part 35 and against the rear end of the collar 34. A plurality of removable and replaceable screws 39 extend through holes in the flange 38 and are screwed into threaded holes in the adjacent end of the collar 34, thereby cooperating with the cement mentioned to hold the parts 34, 35 and 36 rigidly in assembled relationship. The outside diameter of the sleeve 36 is preferably less than the inside diameter of the housing 28 and the inside diameter of the extension 15 in order not to interfere with the freedom of longitudinal movement of the movable assembly along the rigid tube 23.

The device or means for changing the color of the light of the lamp 2 as projected by the reflector 1 from white to amber, or other color that may be required to afford the desired lighting effects under different prevailing conditions, constitutes a part of the movable assembly that includes the elements 34, 35 and 36. This device is preferably made of glass coated or processed or otherwise formed, and having in some instances at least generally an amber color. As a consequence, I describe the device as made of amber colored translucent glass, although the device may be made of any color desired for the uses to which it is to be applied and may be of other translucent materials than glass.

In the embodiment chosen for illustration, the device comprises a light filtering cylinder or annular band 40 of glass or other appropriate translucent material having an inside diameter somewhat greater than the outside diameter of the lamp 2 so that the lamp will not interfere with movement of said device to and from effective position. The filtering cylinder or band 40 may be supported by circumferentially spaced arms or webs 41 which leave relatively large colorless windows, shown as window openings 42, between them and rearwardly from the part 40. These colorless windows may be provided otherwise than by the openings 42 as, for instance, by uncolored portions of the cylinder on which the colored filtering band 40 is formed. The color control device is in the general form of a cylinder having the relatively large window openings or windows 42 at its rear for the projection of unfiltered light beams from the lamp 2 to the reflector 1. This device or cylinder is longitudinally movable along the tube 23 from retracted or ineffective position shown in solid lines to extended or effective position shown in broken lines (Fig. 4). The outer end wall 43 of the cylinder or band 40 is inclined or otherwise shaped to conform to the inclination or other shape of the reflecting surfaces of the reflector 1 and of the flange 21. When the device is retracted, the wall 43 is in alinement with the reflecting surfaces of the reflector 1 and the reflecting surface 22 of the flange 21 in order to function substantially as a part of the composite reflector and prevent undesired interference with the uniformity of the light beams. The wall 43 is preferably coated or processed so that it constitutes an efficient reflecting device.

In its extended or effective position shown by broken lines in Fig. 4, the filtering cylinder or band 40 surrounds the outer or forward end only of the lamp 2 and is located between the outer or forward end of said lamp and a portion of the reflecting surface of the reflector 1. The openings 42 constitute windows leaving the space between the lamp 2 and the central rear area of the surface of the reflector 1 unobstructed. The webs 41 are shown as colorless and do not substantially filter nor interfere with the projection of the light rays from the lamp 1 to the surface of the reflector. The result is, as diagrammatically shown in Fig. 3, that a ring or annulus 44 of amber colored light, or light of other color complementary to the color of the part 40, is projected by the reflector 1 around a central projection of white light. I have found that this type of light easily accomplishes the desired effects and results.

My invention embodies means for using both filaments 3 and 12 simultaneously when the color control device is brought into use, although this is not a limitation of the invention. A wire or flexible rod 45 has one end attached to the movable color control unit. The rod 45 extends for longitudinal movements through a hole in the end wall of the housing 28 and is screwed into a threaded hole in the outer or rear end of the bushing collar 34 (Fig. 4). A socket 46 is rigidly secured to the end of the housing 28 and encloses a quantity of packing 47 through which the rod 45 extends for sliding movements. This packing provides a leakproof and impervious mounting for the rod 45 and leaves said rod freely movable longitudinally to operate the light color control unit described. The rod 45 extends through a flexible tube 48 having one end secured within the socket 46 and the opposite end attached to a rigid frame 49. As shown in Fig. 1, one of these connections is for the light color control device of each headlight lamp of the motor vehicle. The rear ends of the rods 45 are attached to a crosshead 50 supported for sliding movements in the frame 49. A spring 51 has one end attached to the frame 49 and its opposite end attached to the crosshead 50 and expands or otherwise functions to impel and yieldingly hold the crosshead 50 in its unoperated position in the frame 49. In said unoperated position of the crosshead 50, the rod 45 and the light color control unit are held retracted, which is to say, in the positions shown in solid lines in Fig. 4.

A bell crank lever is pivotally mounted on a support 52 and has one arm 53 connected with the crosshead 50 by a flexible link 54. The opposite arm 55 of said bell crank lever is connected to the forward end of a link 56 extending for longitudinal sliding movements through a tube 57 to and through the instrument board 58. The rear end of the link 56 is equipped with an operating knob or handle 59. In the normal or unoperated positions of the parts, the knob or handle 59 is adjacent to the instrument board 58. When the knob or handle 59 is drawn rearwardly in a direction away from the instrument board 58, the connections therefrom including the rods 45 are operated to move the light color control units comprising the cylinders or bands 40 forwardly to effective positions. When the light color control units are in their effective positions, the cylinders or bands 40 are approximately in the positions indicated by dotted lines in Fig. 4, so that amber colored rings or bands 44 are formed on the reflectors 1. The spaces 60 within the rings or bands 44 are approximately oval, with the result that the light projected from each reflector includes a ring or band of amber colored light surrounding an oval white or uncolored light projected from the oval central area 60 of the reflector.

Both the high beam filaments 3 and the low beam filaments 12 may be electrically energized automatically and as an incident to movement of the light color control devices to effective or forwardly extended position or not, as desired. An extension 61 of the wire 9 leads to electrical connection with a contact switch member 62. A cooperating contact switch member 63 is insulated from the member 62 and has a lead 64 providing electrical connection therefrom to the wire 13. An actuator 65 is attached to the link 56. In the unoperated position of the link 56, which is to say when the link 56 is in the position it occupies when the light color control unit is in its unoperated or ineffective position, the actuator 65 is out of engagement with the switch member 63 and said switch member is out of contact with the switch member 62 so that the switch 62, 63 is open. When the link 56 is operated as required to move the light color control units to their effective positions, the actuator 65 automatically and as an incident to such operation closes the switch 62, 63, thereby electrically energizing the low beam filaments 12 while the high beam filaments 3 remain energized.

Of course, it is apparent that the switch 62, 63 may be omitted, leaving only the high beam filaments 3 or the low beam filaments 12 electrically energized and functioning according as the switch 6 may be engaged with the contact member 7 or the contact member 14, when the light color control units are moved to their effective positions. These and other variations in the construction and arrangement of the invention may be used without departure from the nature and principle thereof.

Figure 5:
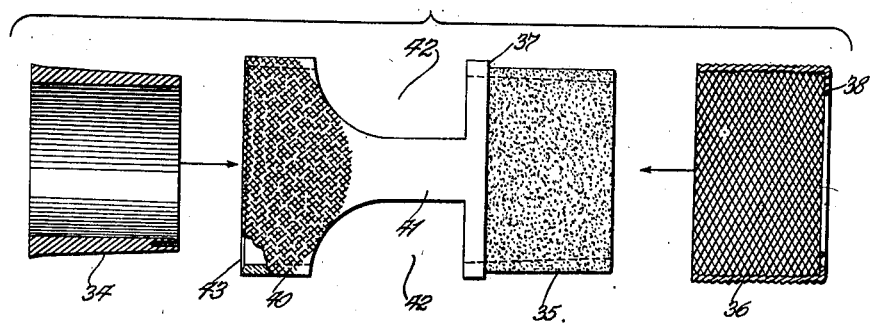
Fig. 5 is a side elevation of the light color controlling tube and its immediate attachments in extended or unattached relationship.

The fact that the device 40 is enclosed by structure having tight joints and cannot directly contact with outside moisture or outside air prevents the accumulation or deposit of any moisture on said device. This is important, and the means for preventing the deposit or accumulation of moisture on said device constitutes a vital or indispensable feature of the invention. The windows or openings 42 are at diametrically opposite sides of the light color control device so that the supports 41 for said device are at the upper and lower sides thereof. The colored area on the device 40 is preferably of greater longitudinal length at the upper and lower portions than at the lateral sides thereof, as should be understood by reference to Fig. 5. This results in the formation of the oval white light area 60 at each reflector, the major axis of which is horizontal and the minor axis of which is vertical. As shown in Fig. 3, the colored area 44 at each reflector because of the oval white light area 60 is of greater vertical radial width than the horizontal radial width thereof. The upper and lower portions of the ring of colored light surrounding the oval central white light are, therefore, of greater vertical thickness than the horizontal thickness thereof.

The spring 51 yieldingly holds each and both of the devices 40 retracted and cooperates with the frictional resistance against accidental movement of the parts to prevent undesired movement of each or both of the devices 40 from their unoperated positions, which are the positions in which they are retracted. When the link 56 is moved to the position it occupies in closing the switch 62, 63 which is also the position it occupies when the device 40 is in its effective or projected position shown by broken lines in Fig. 4, the spring contact member 63 engages the actuator 65 in such a way as to prevent accidental movement of the parts. It also prevents movement of the parts by the spring 51 to retract the device 40 from the broken line position to the solid line position, as shown in Fig. 4. Therefore, the spring contact member 63, in cooperation with the actuator 65, constitutes means for positively holding the device 40 in its operated and effective position to cause the reflector 1 to project light beams in the form indicated by Fig. 3, or in any desired variation of that form, according to the colored areas of said device 40. For instance, lateral sides of the device 40 may be left uncolored, if desired, so as to omit the colored lateral portions of the area 44, and form only colored areas at the upper and lower margins of the reflector.

An important contributing factor is the fact that the lamp 2 is rigidly secured to the collar 20 in a prefocused relationship with respect to the reflecting surface 22 of the flange 21. Therefore, when the lamp 2 with its attached collar 20 is secured to the tube 23 in a position in which the flange 21 abuts against the end of said tube, the lamp is properly focused with respect to the reflector. As a consequence, the lamps 2 and their attached collars 20 are removable and replaceable and interchangeable. The invention may be applied to existing motor vehicles merely by modification of the construction of the reflectors by providing the extensions 15, and may be mounted in various other environments having reflectors with lamps or light bulbs therein. To apply the invention to these existing structures, it is only necessary to form the central opening in the reflector with the extension 15 and mount the other elements in operative connection therewith. The invention may also be embodied in lighting systems as originally manufactured without changing the manufacturing standards in important particulars.

The invention may be varied otherwise than as specifically mentioned herein and within the scope of equivalent limits without departure from the nature and principle thereof.

I claim:

1. A lighting device comprising a lamp including both a high beam filament and a low beam filament, a reflector for projecting beams of light emanating from said lamp, circuit wires in electrical communication with said filaments respectively, a switch device in connection with said wires and settable to control electrical energization of either of said filaments as desired while the other filament remains unenergized, a cylinder of translucent material supported for movements longitudinally of its axis into and from within said reflector and having a filtering portion of a color contrasting with the color of the light emanating from said lamp, an actuator, and mechanism operable by said actuator for simultaneously controlling electrical energization of said low beam filament irrespective of the position of said switch device and for moving said cylinder longitudinally of its axis to a position within said reflector in which said filtering portion encloses the outer portion of said lamp and is between said lamp and said reflector while said high beam filament remains energized through said switch device.

2. A lighting device comprising a lamp including both a high beam filament and a low beam filament, a reflector for projecting beams of light emanating from said lamp, circuit wires in electrical communication with said filaments respectively, a switch device in connection with said wires and settable to control electrical energization of either of said filaments as desired while the other filament remains unenergized, a cylinder of translucent material supported for movements longitudinally of its axis into and from within said reflector and having a filtering portion of a color contrasting with the color of the light emanating from said lamp, an actuator, and mechanism operable by said actuator for simultaneously controlling electrical energization of said low beam filament irrespective of the position of said switch device and for moving said cylinder longitudinally of its axis to a position within said reflector in which said filtering portion encloses the outer portion of said lamp and is between said lamp and said reflector irrespective of whether said high beam filament is energized through said switch device or not.

3. In a lighting device having a lamp including both high beam and low beam filaments, and a reflector for projecting beams of light emanating from said lamp; a switch movable from positions to control electrical energization of either said high beam filament or said low beam filament as desired, a cylinder of translucent material having an outer end filtering portion of a color contrasting with the color of the light from said lamp and also having relatively large colorless windows in its rear portion, means for supporting said cylinder for movement longitudinally of its axis into said reflector and between said reflector, whereby said filtering portion tive to move said cylinder longitudinally of its axis as aforesaid to a position in which said filtering portion surrounds the outer end portion of said lamp within said reflector and in which position said windows are between said lamp and said reflector, whereby said filtering portion filters the light beams projected from said lamp through said filtering portion to the outer area of said reflector and said windows leave unfiltered the light beams projected from said lamp through said windows to the central area of said reflector adjacent to said lamp and said cylinder, and means controlled by said mechanism for simultaneously energizing said low beam filament when said mechanism is operated as aforesaid.

4. In a lighting device having a lamp provided with a filament for electrical energization, a reflector for projecting beams of light emanating from said lamp, and means for rigidly supporting said lamp axially within said reflector; a cylinder of translucent material having an outer end filtering portion of a color contrasting with the color of the light from said lamp and also having a colorless rear portion supporting said filtering portion, means for supporting said cylinder for movements longitudinally of its axis into said reflector and between said reflector and said lamp, mechanism for simultaneously controlling energization of said filament and also moving said cylinder longitudinally of its axis into said reflector and between said reflector and said lamp to a position in which said filtering portion surrounds the outer portion only of said lamp and said rear portion is between said lamp and said reflector, whereby said filtering portion filters the light beams projected therethrough to the outer area of said reflector and said colorless rear portion leaves unfiltered the light beams projected therethrough from said lamp to the central rear area of said reflector adjacent to said cylinder.

5. A lighting device comprising a lamp including both a high beam filament and a low beam filament, a reflector for projecting beams of light emanating from said lamp, electric circuits in electrical communication with said respective filaments, a switch movable from positions to control electrical energization of either of said filaments as desired, a device operable to open and to close said circuit for said low beam filament and thereby control energization of said low beam filament while said switch remains stationary in either of said positions, a cylinder supported for movements longitudinally of its axis from a position substantially at the side of said reflector opposite from said lamp to a position in which said cylinder projects beyond said reflector and surrounds said lamp, and connections operated by said device for moving said cylinder to said last named position when said device is operated to close said circuit for said low beam filament.

6. A lighting device comprising a lamp including both a high beam filament and a low beam filament, a reflector for projecting beams of light emanating from said lamp, electric circuits in electrical communication with said respective filaments, a switch movable to positions to open and to close either of said circuits as desired, a manually movable device operable to open and close said circuit for said low beam filament and thereby control energization of said low beam filament irrespective of the position of said switch, a cylinder of translucent material having an outer end filtering portion of a color contrasting with the color of the light from said lamp, means for supporting said cylinder for movements longitudinally of its axis from a position substantially at the side of said reflector opposite from said lamp to a position in which said cylinder projects beyond said reflector and surrounds said lamp and filters the light beams projected from said lamp to said reflector, connections operated by said device for moving said cylinder to said last named position when said device is operated to close said circuit for and energize said low beam filament, and means for preventing said cylinder from turning about its axis during movement thereof by said connections.

PAUL BAKER.